United States Patent Office 2,922,874
Patented Jan. 26, 1960

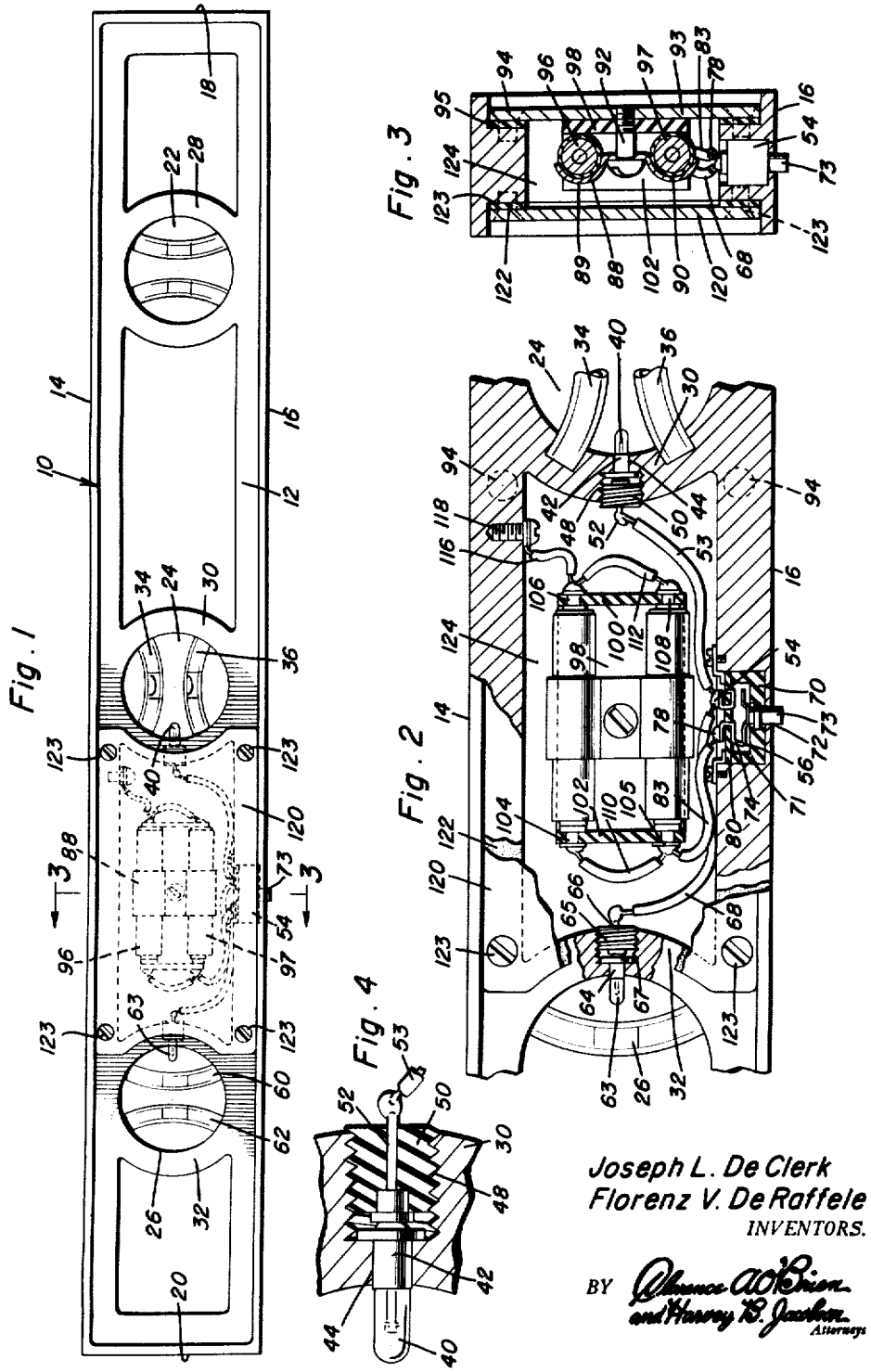

2,922,874

ILLUMINATED LEVEL

Joseph L. De Clerk, Eatontown, N.J., and Florenz V. De Raffele, New Rochelle, N.Y.

Application May 2, 1957, Serial No. 656,615

1 Claim. (Cl. 240—6.44)

This invention relates to an illuminated level.

Working conditions encountered by carpenters, masons, electricians, steam fitters and allied tradesmen in building construction and maintenance are such that it is not unusual for them to be required to read a level under poor lighting conditions. Cloudy or rainy days cause additional problems.

An example of present practice is the inconvenient use of matches, flashlights or any other source of illumination which may be available when viewing the level in dark areas. This causes loss of time and accuracy. It is necessary to hold the level with one hand while the other hand holds the matches or flashlight. It obviously would be much better to have the other hand free for marking or hammering or for any other duty.

Accordingly, the object of the invention is to provide an improved level which will enable the user to see the bubble in the level in such places as closets, cellars, attics, crawl spaces, storage rooms, inside kitchen cabinets, base cabinets, sub-cellars, storage tanks, etc.

A more specific object of the invention is to provide a practical level that is of such construction as to be acceptable by the various professionals or advanced amateurs in pursuing trades, hobbies or other duties or pleasures. This is achieved by utilizing a high quality ordinary level and adapting it to accommodate a reasonably long life source of electric current to illuminate one or more electric lamps that are conveniently carried within the confines of the level. This provides a level which will not be overly fragile but yet, will yield all the advantages of the invention.

A further object of the present invention is to provide a level as described above wherein the switch for actuating the lamps has a switch operator which protrudes through one of the edge surfaces of the level so that it may be automatically closed in response to placing of the level on the workpiece. The same switch may be actuated by the worker by merely manually depressing it if he should so desire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a level which is constructed in accordance with the invention;

Figure 2 is an enlarged fragmentary elevational view thereof, parts being broken away in section to illustrate the electric light attachment;

Figure 3 is a transverse sectional view on an enlarged scale taken on the line 3—3 of Figure 1; and Figure 4 is an enlarged fragmentary detail showing the means for mounting one of the lamps in the level.

In the accompanying drawing there is shown a level 10 which is of practically conventional construction insofar as the body 12 thereof is concerned. It is substantially rectangular and has two longitudinal level edge or side wall surfaces 14 and 16 which are parallel to each other and two level end surfaces 18 and 20 which are parallel to each other and perpendicular to the surfaces 14 and 16. Three groups 22, 24 and 26 of two vials each are mounted within recesses formed by frames 28, 30 and 32 in the level body. It is appreciated that the source of illumination may be provided for one, two or all three of the groups of vials. For purposes of illustration, we have shown the groups 24 and 26 as illuminated, this typifying the invention.

The source of illumination for the group 24 of vials, consisting of vials 34 and 36, is a small electric lamp 40 in lamp socket 42. It is disposed in a passage 44 formed in frame 30. The lamp socket shoulders on an end wall of the threaded counterbore 48 aligned with passage 44, which counterbore supports hollow insulated plug 50. The plug is threaded in the counterbore 48 and carries the center electrode 52 to which wire 53 is soldered. This wire extends to a terminal 54 of switch 56.

The group 26 of vials is made of vials 60 and 62 located within frame 32. There is a lamp 63 in socket 64, the latter being held in place and backed by the hollow insulating plug 65 that has a center contact 66 extending therethrough and engaging the contact of socket 64. This socket and lamp arrangement is identical to the previously described socket and lamp arrangement and it is disposed in the passage and counterbore 67 formed in frame 32. Wire 68 is attached to the center contact 66 and soldered to the terminal 54 of switch 56.

Switch 56 consists of a switch housing 70 and is disposed in an inwardly opening recess 71 formed in a side edge portion of the level body. Aperture 72 opening through the edge surface 16 of the level body has the switch operator or actuator 73 of switch 56 extending outwardly therethrough. Movable contact 74 in the form of a spring metal strip is attached to the push-button 73 and to the switch terminal 78 which is carried by the back wall 80 of switch 56, as is the contact 54 of the switch. An end of the flexible contact 74 is adapted to be brought into engagement with the contact 54 in order to establish circuit between wire 83 which is attached to contact 78 and the two wires 53 and 68 which feed the lamps 40 and 63. The body of the level is electrically conductive and serves as the ground connection for the electrical circuit.

A battery holder in the form of a clip 88 having channeled ends 89 and 90, is held by a bolt 92 to the face or closure plate 93 in the level. This face plate is bolted as at 94 in a recess formed in one face of the level, there being a gasket 95 interposed between the face plate 93 and the body of the level to seal out water. Batteries 96 and 97 are held by the brackets 88 and against an insulating panel 98 which is adhesively secured to the inner surface of face plate 93. End walls 100 and 102 which are also of insulating material, are attached to the insulating panel 98 and support four battery pole contacts 104, 105, 106 and 108 which are connected operatively by wires 110 and 112 in order to connect the batteries in parallel with each other. Ground wire 116 is connected to terminal 106 and to a ground post 118 in the form of a bolt which is threaded in a tapped hole in the body of the level. Conductor 83 is connected to the contact 105 and to the contact 78 of the switch thereby operatively connecting the switch 54 in circuit with the electric lights and the batteries.

Base closure plate 120 is mounted by bolts 123 in a recess formed in the face of the body of the level. The face plate 120 is opposite face plate 93 and has a gasket 122 at the edge thereof to seal water from the cavity or chamber 124 within which the batteries are located.

In operation, the bubbles are more easily read by illuminating them. This is achieved by merely depressing the switch operator 73 thereby closing switch 54 and energizing the lamps 40 and 63. It is understood that one or more such lamps may be used depending on the type of level which is desired to be illuminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. For example, the principles of the invention are applicable to wood as well as metal levels. The only alteration necessary being a connection of the ground wire 116 to the lamps 40, 63, rather than to the body of the level.

What is claimed as new is as follows:

In a level, the combination of a body having a work contacting side wall provided with an aperture, an indicating vial mounted in said body parallel to said side wall and arranged to indicate the inclination of said side wall when said side wall is lowermost, a lamp provided in the body adjacent said vial for illuminating the same when the lamp is energized, a source of current for said lamp, a normally open switch mounted in said body in circuit with said lamp and source of current, said switch including a depressible actuator projecting outwardly through said aperture beyond the plane of said work contacting side wall, said actuator being depressible flush with said side wall when the level is positioned on a workpiece, means slidably mounting said actuator for sliding movement in said aperture, means in the path of movement of said actuator for closing said switch whereby to automatically close said switch and actuate said lamp, said body having a chamber therein adjacent said vial, a removable closure for said chamber, said source of current comprising batteries mounted upon said closure plate and removable from said chamber and said switch upon removal of said closure plate.

References Cited in the file of this patent

UNITED STATES PATENTS

| | | |
|---|---|---|
| 1,780,253 | Volz | Nov. 4, 1930 |
| 2,002,602 | Graubner | May 28, 1935 |
| 2,615,122 | Coombs | Oct. 21, 1952 |

FOREIGN PATENTS

| | | |
|---|---|---|
| 20,476/29 | Australia | June 5, 1929 |